United States Patent [19]

Omamyuda et al.

[11] Patent Number: 5,260,682
[45] Date of Patent: Nov. 9, 1993

[54] LIGHT-WAVE DISTANCE MEASURING APPARATUS FOR VEHICLE

[75] Inventors: Yukio Omamyuda, Sagamihara; Shigeru Kimura, Yokohama; Toru Tanabe, Machida; Kazuhisa Iwasaki, Yokohama; Takao Seto, Yokohama; Hideki Kitamura, Yokohama; Kazuhiko Sugimura, Yokohama; Yasushi Senoo, Yokohama, all of Japan

[73] Assignee: Stanley Electric Co., Ltd., Tokyo, Japan

[21] Appl. No.: 846,569

[22] Filed: Mar. 5, 1992

[30] Foreign Application Priority Data

Mar. 12, 1991 [JP] Japan ................................. 3-072600
Mar. 12, 1991 [JP] Japan ................................. 3-072601
Mar. 12, 1991 [JP] Japan ................................. 3-072602

[51] Int. Cl.⁵ ............................................. B60Q 1/00
[52] U.S. Cl. .................................... 340/435; 340/903; 340/436
[58] Field of Search ................... 180/167, 168, 169; 340/435, 436, 555, 903, 904

[56] References Cited

U.S. PATENT DOCUMENTS

4,453,825  6/1984  Buck et al. ............................... 356/5

FOREIGN PATENT DOCUMENTS

0030369  6/1981  European Pat. Off. .
2605799  1/1981  Fed. Rep. of Germany .
0261800  1/1990  Japan ................................. 340/903
8705138  8/1987  PCT Int'l Appl. ................. 340/903
1585053  2/1981  United Kingdom .

Primary Examiner—John K. Peng
Assistant Examiner—Christine K. Oda
Attorney, Agent, or Firm—Frishauf, Holtz, Goodman & Woodward

[57] ABSTRACT

A light-wave distance measuring apparatus has an intermittent controller for continuously changing periods of time during which a light intensity modulator 1 transmits and interrupts transmitting a light intensity modulated signal so as to avoid a synchronization of the light intensity modulated signal of the a first tranmitting apparatus with a light intensity modulated signal transmitted from a second light-wave distance measuring apparatus. The operation of the intermittent controller prevents a misfunction of the apparatus. Provisions of a self-speed detector, a time marker and a light transmission interval measuring circuit enables the apparatus to detect the speed of a target object. Thus, the apparatus is suitable for mounting on a vehicle. The apparatus operates accurately even when both the vehicle and the target object are moving. The apparatus also accurately operates without interference even when other similar light-wave distance measuring apparatus for vehicles are used in a small area.

2 Claims, 5 Drawing Sheets

LIGHT-WAVE DISTANCE MEASURING APPARATUS FOR VEHICLE

BACKGROUND OF THE INVENTION

1. Field of the Invention

The present invention relates to a light-wave distance measuring apparatus used or for measuring a distance to a target object.

2. Description of the Related

FIG. 5 is an electric circuit block diagram of a prior art light-wave distance measuring apparatus, i.e., for apparatus electrically measuring a distance up to a target object using light waves.

This prior art apparatus comprises a light intensity modulator 1, a reference oscillator 2, a local oscillator 3, a first mixer 4, a demodulator 5, a second mixer 6, a phase meter 7 and a CPU 8. The reference oscillator 2 produces a reference signal. The light intensity modulator 1 produces a light intensity modulated signal (outgoing beam of light) L-1 from the reference signal from the reference oscillator 2 and transmits it to a target object (the distance to which to be measured).

The demodulator 5 demodulates a reflected light L-2 received from the target object. The first mixer 4 mixes the reference signal from the reference oscillator 2 with the local oscillator signal from the local oscillated from local the frequency of the reference signal. The second mixer 6 mixes the demodulated signal from the demodulator 5 with the local oscillator signal for converting the frequency of the demodulated signal. The phase meter 7 detects a phase difference between the frequency-converted signal from the first mixer 4 and the frequency-converted signal from the second mixer 6. The CPU 8 receives and processes a signal from the phase meter 7 indicative of the detected difference and determines the distance to the target object.

Since it is supposed that the prior art light-wave distance measuring apparatus is intended to be used by itself the apparatus usually has no means for overcoming or preventing an interference caused by a light wave transmitted from another light-wave distance measuring apparatus. Accordingly, when other light-wave distance measuring apparatus are mounted on vehicles which gather in a small area, they are respectively exposed to interference created by a light waves from, for example, a vehicle. This causes a problem in distance measurement.

In addition, it is supposed that almost all of prior art light-wave distance measuring apparatuses are employed in a case where both the distance measuring apparatus and the target object are static. Therefore, even if the prior art apparatus can measure a distance to the target object, there is a problem that the prior art apparatus fails to provide sufficient data for distance measurement when both the vehicle on which the apparatus is mounted and the target object move away from or to each other, such as when a vehicle in front of the measuring apparatus moves essentially at the same speed in the same direction as the vehicle on which the apparatus is mounted. The safety factor in the latter case is much lower than when both the apparatus and the target object are static. These skilled in the art have been seeking to solve

SUMMARY OF THE INVENTION

A primary object of the present invention is to provide a light-wave distance measuring apparatus for vehicles which accurately operates even when both the distance measuring apparatus and the target object are moving.

Another object of the present invention is to provide a light-wave distance measuring apparatus for a vehicle which accurately operates without interference even when other light-wave distance measuring apparatuses mounted on vehicles are used in a small area.

In order to achieve these objects, the light-wave vehicle mounted distance measuring apparatus of the present invention for measuring a distance to a target object detects a phase difference between a light intensity modulated signal and a reflected signal of the light intensity modulated signal from the target object and comprises intermittent control means for continuously changing periods of time for permitting and prohibiting transmission of the light intensity modulated signal. The apparatus can prevent interference caused by another light-wave distance measuring apparatus on another vehicle. The apparatus of the present invention may also comprise means for producing time-marking signals at timings at which the light intensity modulated signal has been transmitted, means for measuring an interval between the time-marking signals, means for detecting a self-speed of the vehicle on which the apparatus is mounted and means for computing the speed of the target object from a self-speed signal produced from the self-speed detecting means and for computing the distance to the target object and for selecting a distance resolving power or resolution in response to the self-speed signal.

Since the apparatus of the present invention continuously changes periods of times for transmitting and stopping transmission of the light intensity modulated signal, there is a very low possibility of receiving synchronized signals from another light intensity modulated signal transmitted from an approaching vehicle. Thus, the apparatus can avoid the errors in measuring the distance to the target object due to misfunction.

In addition, since the apparatus of the present invention produces time marking signals at the starting times of the optical outputs transmitted to the target object, the apparatus can measure the speed of the target object from the interval between the time marking signals, the difference in the distance data and the self-speed of the vehicle on which the apparatus of the present application is mounted. In addition, since the apparatus detects its own speed, the apparatus can easily select the distance resolution appropriate to the self-speed or relative speed of the apparatus and the target object. Thus, the apparatus can accurately measure the distance between the apparatus and the target object even when the both are moving.

DESCRIPTION OF THE PREFERRED EMBODIMENTS

Figure 1:
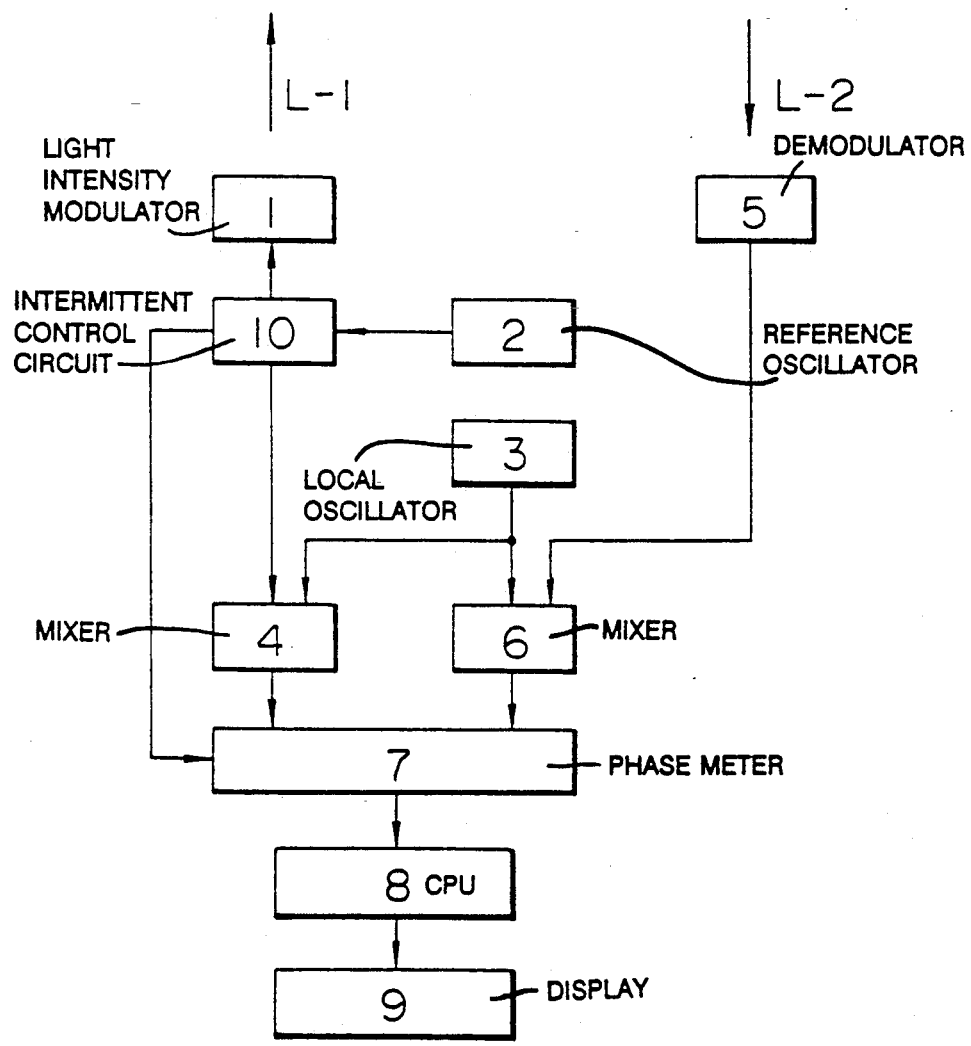
FIG. 1 is a block diagram of a light-wave distance measuring apparatus for vehicle according to a first embodiment of the present invention.
Figure 2:
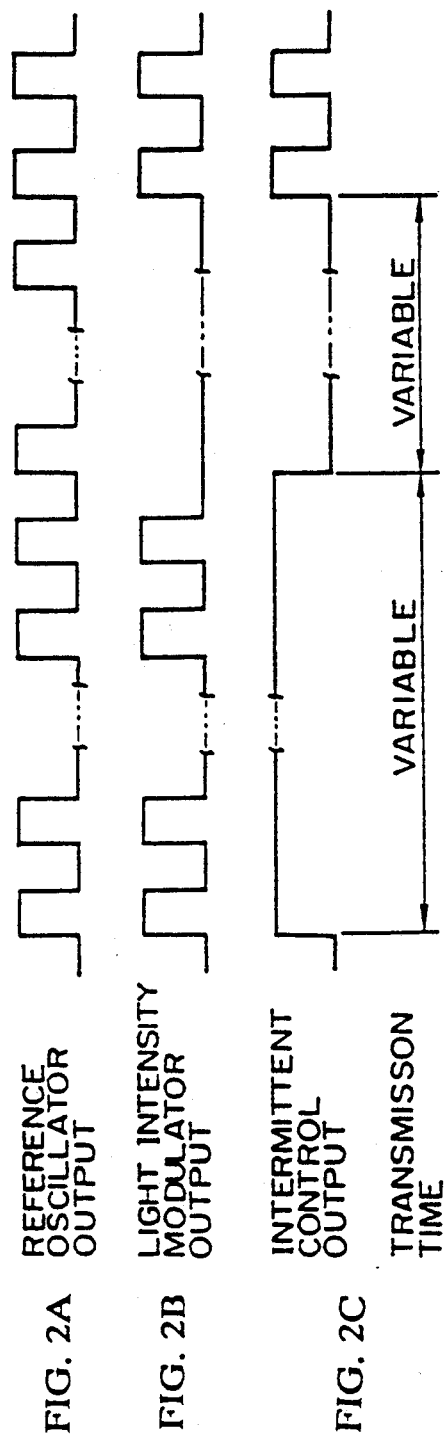
FIGS. 2A, 2B and 2C show timing charts showing the operation of the apparatus of FIG. 1.

A detailed description of the present invention will be hereinafter described with reference to FIGS. 1 through 4. For better understanding, the same components of the embodiments will have the same reference numerals as those of the prior art apparatus and part of descriptions of the components will not be repeated.

FIG. 1 shows a light-wave distance measuring apparatus for vehicle according to a first embodiment of the present invention. The apparatus comprises an intermittent control 10 receiving a reference signal from the reference oscillator 2 and supplying a control signal to the light intensity modulator 1, the first mixer 4 and the phase meter 7.

As shown in FIGS. 2A, 2B and 2C the intermittent control 10 continuously changes a period of time during which it permits the reference oscillator 2 to supply the reference signal to the light intensity modulator 1 and a period of time during which it prohibits the reference oscillator 2 to supply the reference signal to the light intensity modulator 1. Thus, the light intensity modulator 1 produces a light intensity modulated signal only while receiving the control signal from the intermittent control 10.

The phase meter 7 operates only while receiving the control signal from the intermittent control 10. The CPU 8 comprising, e.g., a microcomputer receives and processes a signal from the phase meter 7 and computes a distance between the present vehicle to which the apparatus is mounted and a target object. A display 9 displays the computed distance from the CPU 8.

Thus, since the intermittent control 10 of the first embodiment of the present invention continuously changes the periods of time for permitting and prohibiting the transmission of the light intensity modulated signal, there is a very low possibility that a light intensity modulated signal from an approaching vehicle etc., will be synchronized with a reflected signal from the target object of the present apparatus even if the signal from the approaching vehicle goes to the demodulator 5 of the present apparatus. This reduces the possibility that the apparatus mounted on the vehicle on which the distance measuring apparatus is mounted will misfunction.

Figure 3:
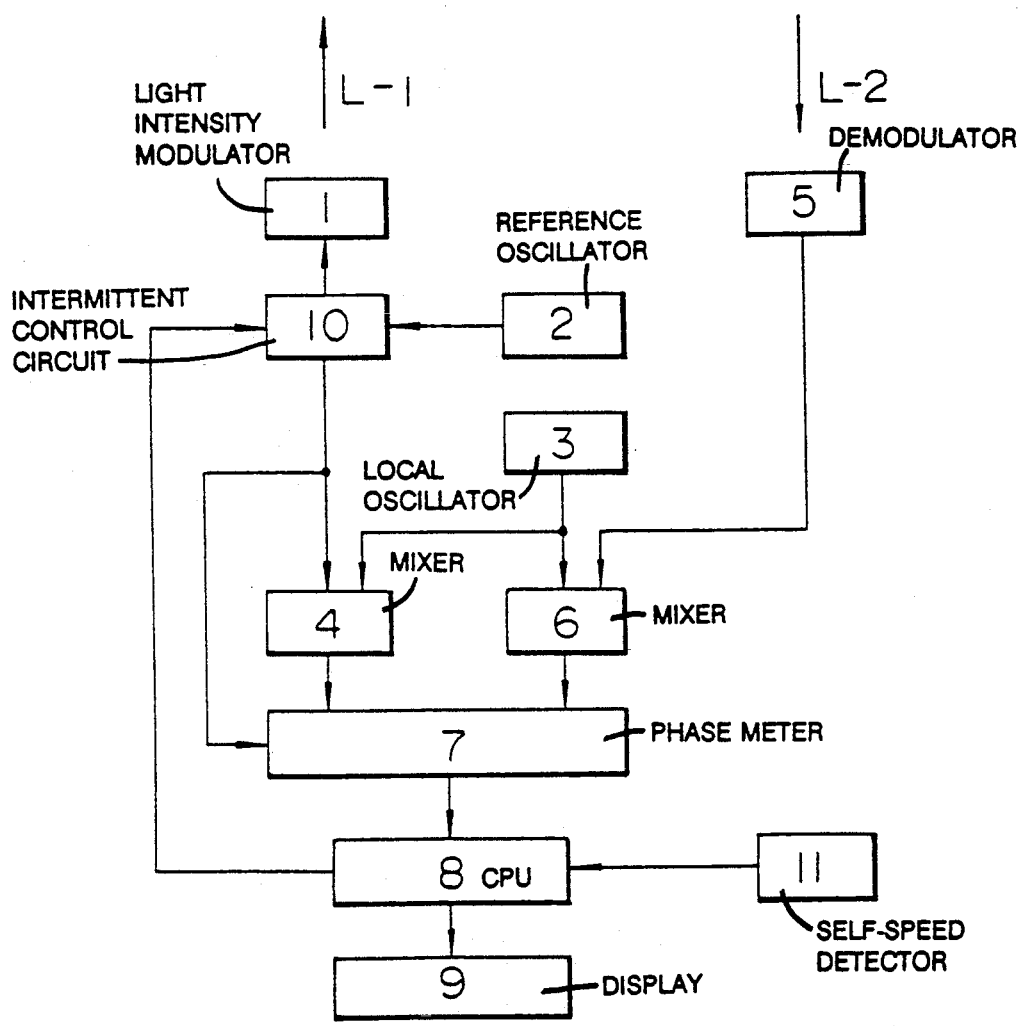
FIG. 3 is a block diagram of a light-wave distance measuring apparatus for vehicle according to a second embodiment of the present invention.

FIG. 3 shows a light-wave distance measuring apparatus for a vehicle according to a second embodiment of the present invention. This apparatus comprises a self-speed detector 11 for detecting the speed of the apparatus from, e.g., the number of revolution of a tire of the vehicle on which the distance measuring apparatus is mounted. The CPU 8 computes the periods of time for permitting and prohibiting the transmission of the light intensity modulated signal from the light intensity modulator 1 from the self-speed data from the self-speed detector 11 and supplies a corresponding control signal to the intermittent control 10.

Thus, since the apparatus of the second embodiment determines the periods of time for permitting and prohibiting the transmission of the light intensity modulated signal in response to a constant, self-speed, peculiar to the vehicle, on which the measuring apparatus is mounted, the apparatus can more clearly distinguish a reflected beam of light of the present apparatus from a light intensity modulated beam of light and a corresponding reflected beam of light of a second light-wave distance measuring apparatus mounted on another vehicle, even if the second apparatus transmits a light intensity modulated signal similar to that of the present invention. Accordingly, the apparatus of the second embodiment of the present invention is more error free then the first embodiment.

Figure 4:
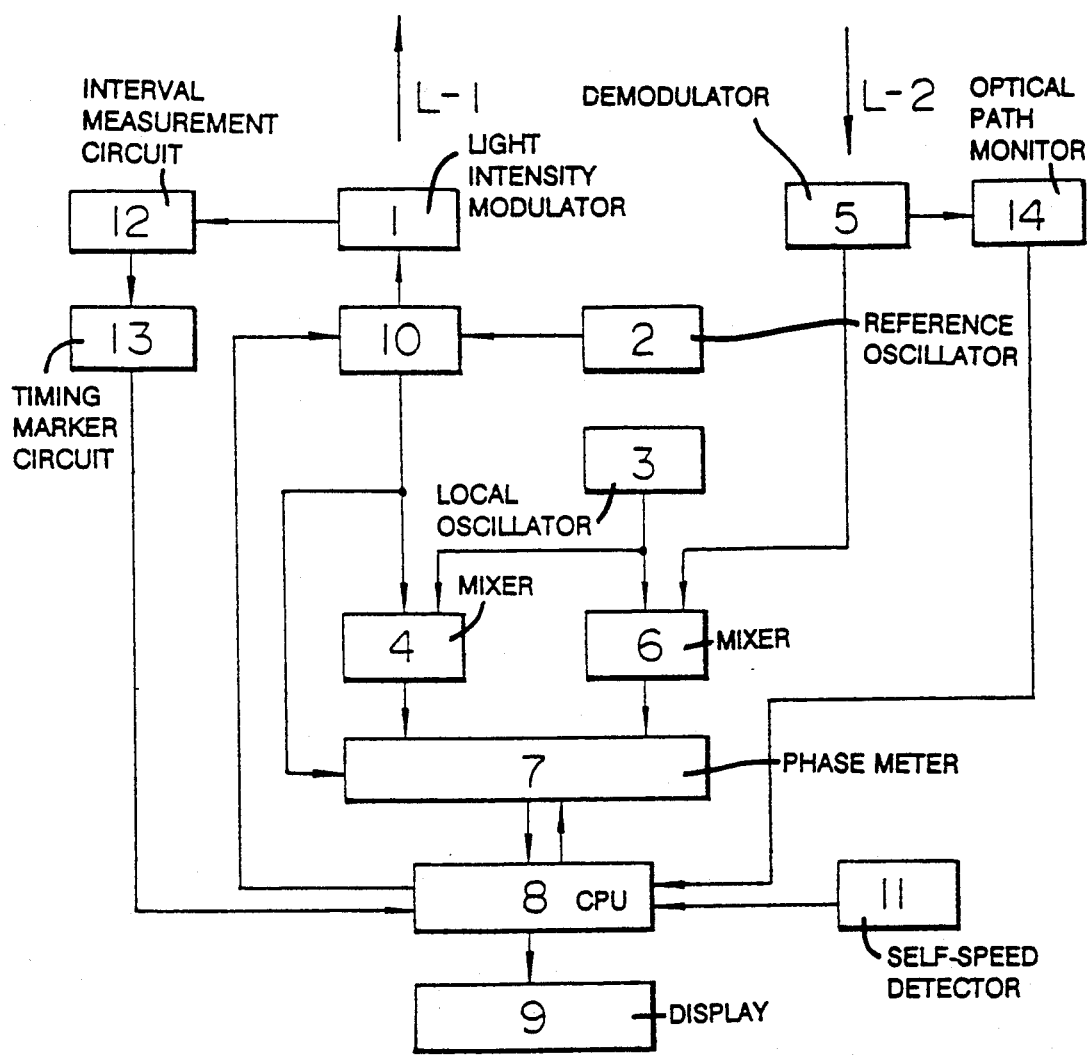
FIG. 4 is a block diagram of a light-wave distance measuring apparatus for vehicle according to a third embodiment of the present invention.
Figure 5:
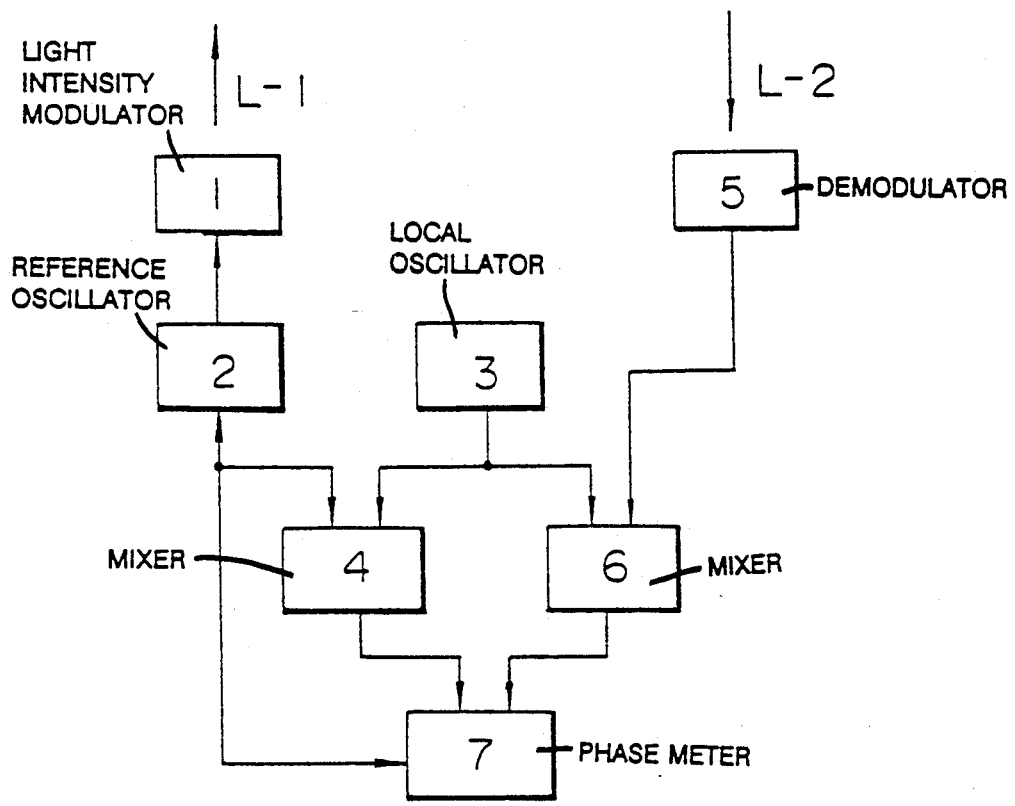
FIG. 5 is a block diagram of a prior art light-wave distance measuring apparatus.

FIG. 4 shows a light-wave distance measuring apparatus for a vehicle according to a third embodiment of the present invention. This apparatus comprises a timing marker 12 and a light transmission interval measurement circuit 13 in addition to the components of the apparatus of the second embodiment of the present invention. The apparatus of the third embodiment can determine whether or not the target object is moving and thus enhances usability. In addition, to that both the second and third embodiments can avoid interference with a light intensity modulated signal from a similar light-wave distance measuring apparatus mounted on another vehicle.

The time marker 12 supplies a time marking signal to the light transmission interval measurer 13 at a starting time of an optical output of the light intensity modulator 1, i.e., a time at which the light intensity modulator 1 starts producing a light intensity modulated signal. The light transmission interval measurement circuit 13 measures an interval between time marking signals and supplies corresponding interval data to the CPU 8.

The CPU 8 computes the speed of the target object from the interval data provided by the light transmission interval measurement circuit 13, the difference between the last and a present measured values of the distance to the target object derived from phase difference data between the outgoing and reflected beams of light, and the self-speed data of the apparatus obtained from the self-speed detector 1. The display 9 displays the computed speed of the target object as computed by the CPU 8.

The CPU 8 converts the phase difference data to distance data, receives the self-speed data from the self-speed detector 11, selects a distance resolution of the phase meter 7 in response to the self-speed data, and supplies a signal of the selected distance resolution to the phase meter 7. Thus, the CPU 8 selects a measurement accuracy depending on whether the target object is static or approaches the measuring apparatus, for example.

In FIG. 4, the demodulator 5 has an optical path monitor 14 which monitors data of the outgoing beam of light L-1 and the reflected beam of light L-2 so as to detect the phase difference (e.g. an interception in optical paths between the apparatus and the target object), i.e., a significant change in the reflected beam of light L-2 could affect the distance data monitor 14 heps reduce malfunction of the apparatus.

Thus, the apparatus of the third embodiment of the present invention produces time marking signals at the starting times at which the light intensity modulator 1 has started transmitting the light intensity modulated signal to the target object, so that the apparatus can computes the speed of the target object from the interval between the time marking signals. The CPU 8 computers, the difference between the distance data and the self-speed. In addition, since the apparatus detects its own speed, the apparatus can easily select the distance resolution appropriate to the self-speed or relative speed of the apparatus and the target object. Thus, the apparatus can accurately measure the distance between the apparatus and the target object even when the both are moving.

What is claimed is:

1. A light-wave distance measuring apparatus for measuring a distance to a target object from a vehicle on which said distance measuring apparatus is mounted, said distance measuring apparatus comprising:

detecting means for detecting a phase difference between a transmission of a light intensity modulated signal having a given frequency, by a transmitting means, and said light intensity modulated signal reflected from the target object, received by a receiving means, said phase difference varying in accordance with the actual distance between said vehicle and said target object;

control means for changing a first plurality of equal periods of time during which said transmission of the frequency light intensity modulated signal occurs and for changing a second plurality of equal periods of time during which said transmission of the frequency light intensity modulated signal does not occur;

speed detecting means for detecting an actual speed of the vehicle on which the distance measuring apparatus is mounted; and said control means including means for respectively varying said first and second pluralities of equal periods of time based on (i) both the detected phase difference between the transmitted light intensity modulated signal transmitted by said transmitting means and the reflected light intensity modulated signal received by said receiving means, and (ii) the actual speed of said vehicle detected by said speed detecting means.

2. The distance measuring apparatus according to claim 1, further comprising:

means for producing time-marking signals whenever the transmitting means transmits said light intensity modulated signal;

measuring means for measuring an interval of time between first and second ones of said time marking signals;

computing means for computing a speed of the target object based on said actual speed of said vehicle detected by said speed detecting means, and for computing the actual distance between said vehicle and the target object based on an output from said measuring means and said computed speed of said target object; and said computing means selecting a distance resolution accuracy based on said detected actual speed of said vehicle.

* * * * *